US006326583B1

(12) United States Patent
Hardwick et al.

(10) Patent No.: US 6,326,583 B1
(45) Date of Patent: Dec. 4, 2001

(54) GAS CONTROL SYSTEM FOR A PLASMA ARC TORCH

(75) Inventors: Steven F. Hardwick, John's Island; J. Travis Hardwick; David L. Newcomb, both of Charleston, all of SC (US)

(73) Assignee: Innerlogic, Inc., Charleston, SC (US)

( * ) Notice: Subject to any disclaimer, the term of this patent is extended or adjusted under 35 U.S.C. 154(b) by 0 days.

(21) Appl. No.: 09/540,077

(22) Filed: Mar. 31, 2000

(51) Int. Cl.[7] .................................................... B23K 10/00

(52) U.S. Cl. ............................... 219/121.55; 219/121.44; 219/121.54; 219/121.39

(58) Field of Search ......................... 219/121.56, 121.54, 219/121.57, 74, 75, 121.51, 121.48, 121.39, 121.44, 121.55

(56) References Cited

U.S. PATENT DOCUMENTS

| | | | |
|---|---|---|---|
| 2,906,858 | 9/1959 | Morton, Jr. . | |
| 3,082,314 | 3/1963 | Arata et al. . | |
| 3,131,288 | 4/1964 | Browning . | |
| 3,204,076 | 8/1965 | Browning . | |
| 3,242,305 | 3/1966 | Kane et al. . | |
| 3,272,962 | 9/1966 | Mauskapf . | |
| 3,373,306 | 3/1968 | Karlovitz . | |
| 3,403,211 | 9/1968 | Foex . | |
| 3,476,906 | 11/1969 | Rovan . | |
| 3,534,388 | 10/1970 | Takakiyo et al. . | |
| 3,536,885 | 10/1970 | Mitchell . | |
| 3,541,297 | 11/1970 | Sunnen et al. . | |
| 3,567,898 | 3/1971 | Fein . | |
| 3,575,568 | 4/1971 | Tateno . | |
| 3,588,594 | 6/1971 | Yamamoto et al. . | |
| 3,601,578 | 8/1971 | Gebel et al. . | |
| 3,619,549 | 11/1971 | Hogan et al. . | |
| 3,641,308 | 2/1972 | Couch, Jr. et al. . | |
| 3,643,580 | 2/1972 | Siegel . | |
| 3,644,782 | 2/1972 | Sheer et al. . | |
| 3,770,935 | 11/1973 | Tateno et al. . | |
| 3,787,247 | 1/1974 | Couch, Jr. . | |
| 3,833,787 | 9/1974 | Couch, Jr. . | |
| 3,914,573 | 10/1975 | Muehlberger . | |
| 3,949,188 | 4/1976 | Tateno . | |
| 3,988,566 * | 10/1976 | Vogts et al. | 219/121.56 |
| 4,029,930 | 6/1977 | Sagara et al. . | |
| 4,060,088 | 11/1977 | Morrison, Jr. et al. . | |
| 4,133,987 | 1/1979 | Lakomsky et al. . | |
| 4,163,891 | 8/1979 | Komatsu et al. . | |
| 4,174,477 | 11/1979 | Essers et al. . | |
| 4,175,225 * | 11/1979 | Holko | 219/74 |
| 4,195,216 | 3/1980 | Beauchamp et al. . | |
| 4,203,022 | 5/1980 | Couch, Jr. et al. . | |
| 4,275,287 | 6/1981 | Hiratake . | |
| 4,282,418 | 8/1981 | Wuestner . | |
| 4,291,217 | 9/1981 | Braun . | |
| 4,341,941 | 7/1982 | Tateno . | |
| 4,361,748 | 11/1982 | Couch, Jr. . | |
| 4,382,170 | 5/1983 | Klingel . | |
| 4,389,559 | 6/1983 | Rotolico et al. . | |

(List continued on next page.)

FOREIGN PATENT DOCUMENTS

| | | |
|---|---|---|
| 2135469 | 12/1972 | (FR) . |
| 459853 | 4/1970 | (JP) . |
| 4730496 | 8/1972 | (JP) . |

(List continued on next page.)

*Primary Examiner*—Mark Paschall
(74) *Attorney, Agent, or Firm*—Dority & Manning, PA

(57) ABSTRACT

An apparatus and process is provided for controlling the selection and supply pressure of gases used in a plasma arc torch. A plurality of pressurized feed gases are selectively routed by solenoid gas valves to one or more motorized pressure regulators. A separate regulator controls the pressurized output of a selected pre-flow gas, plasma gas, shield gas, and post flow gas. A microprocessor establishes recommended pressures for each type of gas and prevents operating pressures from being used which may damage a plasma arc torch.

13 Claims, 2 Drawing Sheets

U.S. PATENT DOCUMENTS

| | | | |
|---|---|---|---|
| 4,410,788 | 10/1983 | Summers et al. . | |
| 4,421,970 | 12/1983 | Couch, Jr. . | |
| 4,506,136 | 3/1985 | Smyth et al. . | |
| 4,521,666 | 6/1985 | Severence, Jr. et al. . | |
| 4,567,346 | 1/1986 | Marhic . | |
| 4,625,094 | 11/1986 | Marhic et al. . | |
| 4,626,648 | 12/1986 | Browning . | |
| 4,645,899 | 2/1987 | Bebber et al. . | |
| 4,647,082 | 3/1987 | Fournier et al. . | |
| 4,663,512 | 5/1987 | Kneeland et al. . | |
| 4,692,582 | 9/1987 | Marhic . | |
| 4,701,590 | 10/1987 | Hatch . | |
| 4,743,734 | 5/1988 | Garlanov et al. . | |
| 4,748,312 | 5/1988 | Hatch et al. . | |
| 4,762,977 | 8/1988 | Browning . | |
| 4,764,656 | 8/1988 | Browning . | |
| 4,782,210 | 11/1988 | Nelson et al. . | |
| 4,791,268 | 12/1988 | Sanders et al. . | |
| 4,816,637 | 3/1989 | Sanders et al. . | |
| 4,861,962 | 8/1989 | Sanders et al. . | |
| 4,866,240 | 9/1989 | Webber . | |
| 4,882,465 | 11/1989 | Smith et al. . | |
| 4,902,871 | 2/1990 | Sanders et al. . | |
| 4,909,914 | 3/1990 | Chiba et al. . | |
| 4,918,283 * | 4/1990 | Yamade et al. | 219/121.46 |
| 5,013,885 | 5/1991 | Carkhuff et al. . | |
| 5,017,752 | 5/1991 | Severance, Jr. et al. . | |
| 5,023,425 | 6/1991 | Severance, Jr. . | |
| 5,070,227 | 12/1991 | Luo et al. . | |
| 5,089,221 | 2/1992 | Johansson et al. . | |
| 5,105,061 | 4/1992 | Blankenship . | |
| 5,120,930 | 6/1992 | Sanders et al. . | |
| 5,132,512 | 7/1992 | Sanders et al. . | |
| 5,164,568 | 11/1992 | Sanders . | |
| 5,166,494 | 11/1992 | Luo et al. . | |
| 5,170,033 | 12/1992 | Couch, Jr. et al. . | |
| 5,235,162 | 8/1993 | Nourbakhsh . | |
| 5,290,995 | 3/1994 | Higgins et al. . | |
| 5,317,126 | 5/1994 | Couch, Jr. et al. . | |
| 5,393,952 | 2/1995 | Yamaguchi et al. . | |
| 5,396,043 | 3/1995 | Couch, Jr. et al. . | |
| 5,414,237 * | 5/1995 | Carkhuff | 219/121.51 |
| 5,424,507 | 6/1995 | Yamaguchi . | |
| 5,468,026 | 11/1995 | Annestedt . | |
| 5,473,140 | 12/1995 | Colling . | |
| 5,506,384 | 4/1996 | Yamaguchi . | |
| 5,548,097 | 8/1996 | Couch, Jr. et al. . | |
| 5,591,357 | 1/1997 | Couch, Jr. et al. . | |
| 5,624,586 | 4/1997 | Sobr et al. . | |
| 5,653,895 | 8/1997 | Shintani . | |
| 5,695,662 | 12/1997 | Couch, Jr. et al. . | |
| 5,734,144 | 3/1998 | Yamaguchi et al. . | |
| 5,841,095 | 11/1998 | Lu et al. . | |
| 6,028,287 | 2/2000 | Passage et al. . | |
| 6,054,669 * | 4/2000 | Warren, Jr. | 219/121.39 |
| 6,093,905 | 7/2000 | Hardwick et al. . | |

FOREIGN PATENT DOCUMENTS

| | | |
|---|---|---|
| 5082357 | 3/1975 | (JP) . |
| 50135721 | 11/1975 | (JP) . |
| 5116379 | 5/1976 | (JP) . |
| 5121945 | 7/1976 | (JP) . |
| 5236725 | 3/1977 | (JP) . |
| 5768270 | 4/1982 | (JP) . |
| 57165370 | 10/1982 | (JP) . |
| 58205676 | 11/1983 | (JP) . |
| 59141371 | 8/1984 | (JP) . |
| 6055221 | 12/1985 | (JP) . |
| 6228084 | 2/1987 | (JP) . |
| 6233025 | 7/1987 | (JP) . |
| 6310082 | 1/1988 | (JP) . |
| 63101076 | 5/1988 | (JP) . |
| 63180378 | 7/1988 | (JP) . |
| 6483376 | 3/1989 | (JP) . |
| 55144337 | 4/1991 | (JP) . |
| 5104251 | 4/1993 | (JP) . |
| 274263 | 6/1970 | (RU) . |
| 1234104 | 5/1986 | (RU) . |
| 8900476 | 1/1989 | (WO) . |
| 9102619 | 3/1991 | (WO) . |

* cited by examiner

GAS CONTROL SYSTEM FOR A PLASMA ARC TORCH

FIELD OF THE INVENTION

This invention is directed towards an apparatus and process for controlling a plasma arc torch. More particularly, the present invention relates to a control apparatus which regulates the supply of preflow, plasma, shield gases, and post flow supplied to a plasma arc torch.

BACKGROUND OF THE INVENTION

The operation of conventional plasma arc torches is well known and understood by those having ordinary skill in the art. The basic components of these torches are a body, an electrode, mounted in the body, a nozzle defining an orifice for a plasma arc, a source of an ionizable gas, and an electrical supply for producing an arc in the gas.

Initiation of a torch start up sequence involves supplying an electrical current to the electrode, typically a cathode, and the pilot arc is initiated in a pre-flow supply of ionizable gas between the electrode and the nozzle. A flow of a plasma gas is then directed from the electrode to the work piece, wherein the work piece defines the anode and a plasma arc is generated from the electrode to the work piece. Suitable ionizable gases include non-reactive gases such as nitrogen, or reactive gases such as oxygen or air. Shield gases are also employed to increase the efficiency and efficacy of the torch cutting process.

The control and regulation of the various supply gases (preflow, plasma and shield) is needed in order to obtain a high quality, economical cut. Improper supply gas pressures may damage or shorten the shorten the operating life of the torch nozzle and electrode components.

Torch operators frequently rely upon cutting charts to help determine proper combinations of gas and pressure with respect to the work piece material, thickness of the workpiece, operating currents, and desired plasma gas and gas pressures. Frequently, an operator may change an operating parameter without full realization of how the adjustment may impact other attributes of the torch performance. Frequently, operator adjustments lead to less than optimal performance which in turn increases operating costs and contribute to a shortened torch component life.

SUMMARY OF THE INVENTION

It is therefor a principal object of the present invention to provide an apparatus and process for the optimal control of the supply of operating gases to a plasma arc torch. In so doing, the longevity of consumable parts such as electrodes, nozzles, and shields is increased.

An additional object of the invention is to provide an apparatus and process which automatically presets pre-flow, plasma, shielding, and post flow gas pressures for a selected material and thickness.

Additional objects and advantages of the invention will be set forth in part in the following description, or may be obvious from the description, or may be learned through practice of the invention.

In accordance with this invention, an apparatus is provided which permits the automated selection and continuous monitoring of the supply gases used to control a plasma arc torch. In one embodiment of this invention, a supply gas controller for a plasma arc torch is provided in which a user accessible console provides a user interface keypad for selecting menu options, default values, and manual inputting of select parameters. A console housing defines a plurality of gas inlet ports, each inlet port adapted for receiving a source of a pressurized gas such as nitrogen, air, oxygen, or other useful gas. A plurality of solenoid gas valves, each valve having an inlet and an outlet, are retained within the console housing and are used to establish a fluid flow between each inlet gas port and an inlet of a corresponding solenoid gas valve. The solenoid gas valves are responsive to signals from a microprocessor. The microprocessor may thereby regulate the gas selection and flow through the solenoid gas valves.

An outlet of each solenoid gas valve is in fluid communication with at least one of a plurality of pressure regulators. A pressure regulator is, in turn, in communication with a corresponding gas outlet port, namely a pre-flow outlet, a plasma outlet, a post flow outlet, and a shield outlet. For instance, a pressure regulator which supplies a gas under pressure to a pre-flow exit port of the console receives the gas from an external pressurized source. A pressure regulator which supplies a plasma gas flow receives the plasma gas from any one of a number of solenoid valves depending on the plasma gas selected. Similarly, a pressure regulator which supplies the shield gas outlet is in selective communication with a plurality of solenoid valves for receiving a pressurized gas suitable for use as a shield gas.

A microprocessor, responsive to a signal from the user interface, provides a control mechanism for the solenoid gas valves as well as each pressure regulator. In response to an input from the user interface, for example the type and thickness of material to be cut, the microprocessor automatically selects the type and pressure of each of the supply gasses and automatically initiates and controls the supply of the gasses during the cutting operation. In addition, arc current is also determined and automatically transmitted to the power source. The settings for the type and pressure of the supply gasses may be considered "default" settings for a selected type and thickness of material. The microprocessor stores such default settings in a memory or library. Additionally, the microprocessor may prompt the user that certain operational parameters, such as arc voltage, pierce height, cutting height, etc., are available to transmit to a torch height control apparatus, such as the INOVA torch height control made by Innerlogic, Inc. The microprocessor may also provide certain recommended settings, such as cutting speed, and the like.

Once the system has selected the appropriate settings and any required selections or settings have been made by the user, the microprocessor initiates and controls the cutting operation. For example, the microprocessor initiates a pre-flow gas, for example air, via a solenoid valve. The pre-flow gas is directed to its respective pressure regulator and then directed out of an outlet port of the console. Similarly, the appropriate plasma gas is directed via the appropriate solenoid valve to the corresponding plasma gas pressure regulator at the proper time. A similar control process occurs for the shield gas and post flow gas. The microprocessor additionally controls the supply pressure of each gas which is released from any of the pressure regulators, i.e., the pre-flow gas, the plasma gas, the post flow gas, and the shield gas, to the respective outlet ports.

The present invention also includes a useful automated gas flow control process for supplying pre-flow, plasma, shield, and post flow gasses to a plasma arc torch and may including the following steps:

selecting a material workpiece substrate;

providing a thickness value of the substrate;

based on the type and thickness of material, automatically selecting sources for the supply gasses and setting pressure settings for the gasses, the supply gasses including pre-flow, plasma, shield, and post flow gasses;

automatically calculating certain cutting parameter values preferably including but not limited to arc voltage, torch travel speed, cutting height, and a piercing height value and making such values available for use by a torch height control apparatus;

automatically setting and supplying arc current to the power source;

supplying the selected pre-flow gas at the selected pressure to the plasma arc torch in response to a start-up sequence;

supplying the selected plasma gas at the selected pressure to the plasma arc torch in response to the start-up sequence;

supplying the shield gas at the selected pressure to the plasma arc torch in response to the start-up sequence;

maintaining the selected plasma gas and shield gas at the respective pressures; and upon shut down, supplying the post flow gas at the selected pressure.

Yet another embodiment of the invention is directed to a process of controlling the supply gas and gas pressures supplied to a plasma arc torch in an improved method of shutting down a plasma arc torch. The shut down modes and protocols are set forth in applicant's commonly assigned and pending U.S. applications having Ser. No. 09/178,206 and 09/416,304, which are both incorporated herein by reference in their entirety.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

Figure 1:
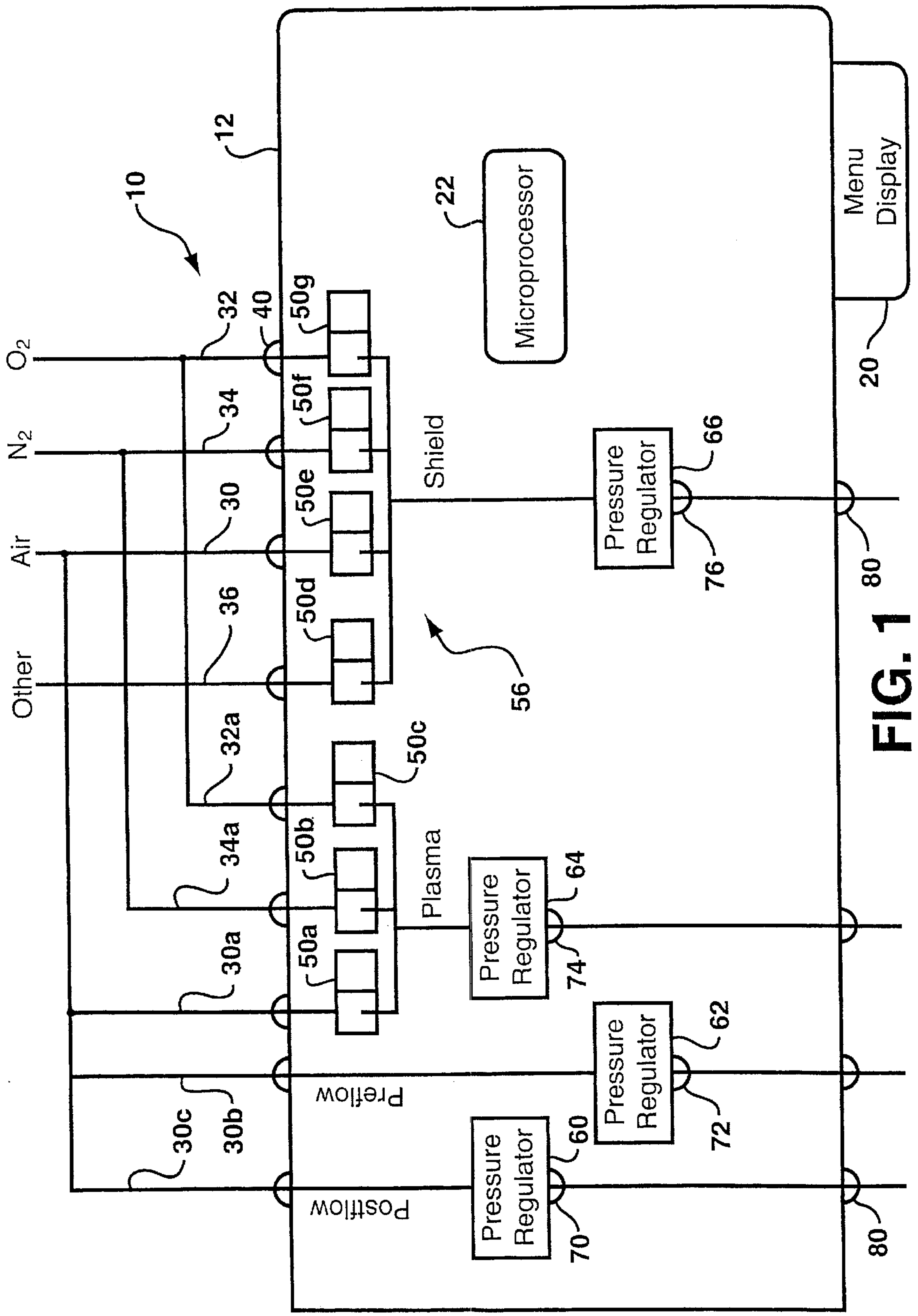
FIG. 1 is schematic representation of a control apparatus to operate the gas supplies of a conventional plasma arc torch.

Repeat use of reference characters in the present specification and drawings is intended to represent the same or analogous features or elements of the invention.

DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are apparent from the following detailed description. It is to be understood by one of ordinary skill in the art that the present discussion is a description of exemplary embodiments only and is not intended as limiting the broader aspects of the present invention, which broader aspects are embodied in the exemplary constructions.

In reference to FIG. 1, a gas control apparatus 10 which regulates the selection and supply pressure of plasma arc torch gases is provided. A control console 12 provides a user accessible menu display 20, such as an electro luminescent (El) display. Display 20 is in communication with a microprocessor 22, such as one provided by a personal computer. A series of inlet ports 40 are defined in the console 10 and are each adapted for receiving individual supply lines of a compressed or pressurized gas as seen in reference to gases 30, 32, 34, and 36. While not illustrated, additional gas inlets may be provided and which have similar operations and functions. By way of example, gas 30 may be pressurized air, gas 32 may be oxygen, gas 34 may be nitrogen gas, and gas 36 may be another gas suitable for plasma arc torch applications. However, any other gases useful for pre-flow, plasma, post flow, and/or shield gas may also be used.

In the embodiment illustrated in FIG. 1, the inlet ports 40 for the plasma and shield gas supplies are in further communication with individual solenoid valves *50a* through *50g* of a solenoid valve bank 56. Suitable solenoid valves are available from MAC Valves of Wixom, Mi. These valves are readily bundled into a single valve bank 56.

The outlets of solenoid valves *50a* through *50c* are in communication with the plasma gas pressure regulator 64. Likewise, the outlets of solenoid valves *50d* through *50g* are in communication with the shield gas pressure regulator 66. Thus, the plasma gas may be selected from any one of the gases 30, 32, and 34 through lines *30a*, *32a*, and *34a*. Likewise, the shield gas may be selected from any one of the gases 30, 32, 34, and 36.

The embodiment of FIG. 1 has been found useful in that the preferred operation of the apparatus and process uses only compressed air as a pre-flow and post flow gas. Although in the embodiment illustrated in FIG. 1, the post flow and preflow gases are not selectable, it should be understood that such gases could be other than air and the appropriate solenoid valve arrangement would be provided in this case. The preflow and post flow gases are directed through their respective inlet ports to pressure regulators 60 and 62.

Each pressure regulator 60, 62, 64, and 66 may be actuated by a high speed stepper motor (not shown) in which motor limit and pressure limit switches are present to prevent delivery of a supply pressure outside of safe operating norms established by the operating system's software. Pressure sensors 70, 72, 74, and 76 are also provided which monitor the actual supply pressure of each pressure regulator. Changes to the supply pressure may be automatically made by adjustments to the pressure regulator during a cutting cycle.

Each pressure regulator 60, 62, 64, and 66 is connected via pressure tubing to a respective exit port 80. Exit ports 80 are used to connect the supply gases to the plasma arc torch assembly (not pictured).

It should be appreciated by those skilled in the art that various arrangements of valves and pressure regulators could be configured to provide the selectable gas arrangement of the present invention. The configuration of FIG. 1 is an example of a preferred arrangement. Other suitable arrangements are within the scope and spirit of the invention and could be easily devised by those skilled in the art.

Figure 2:
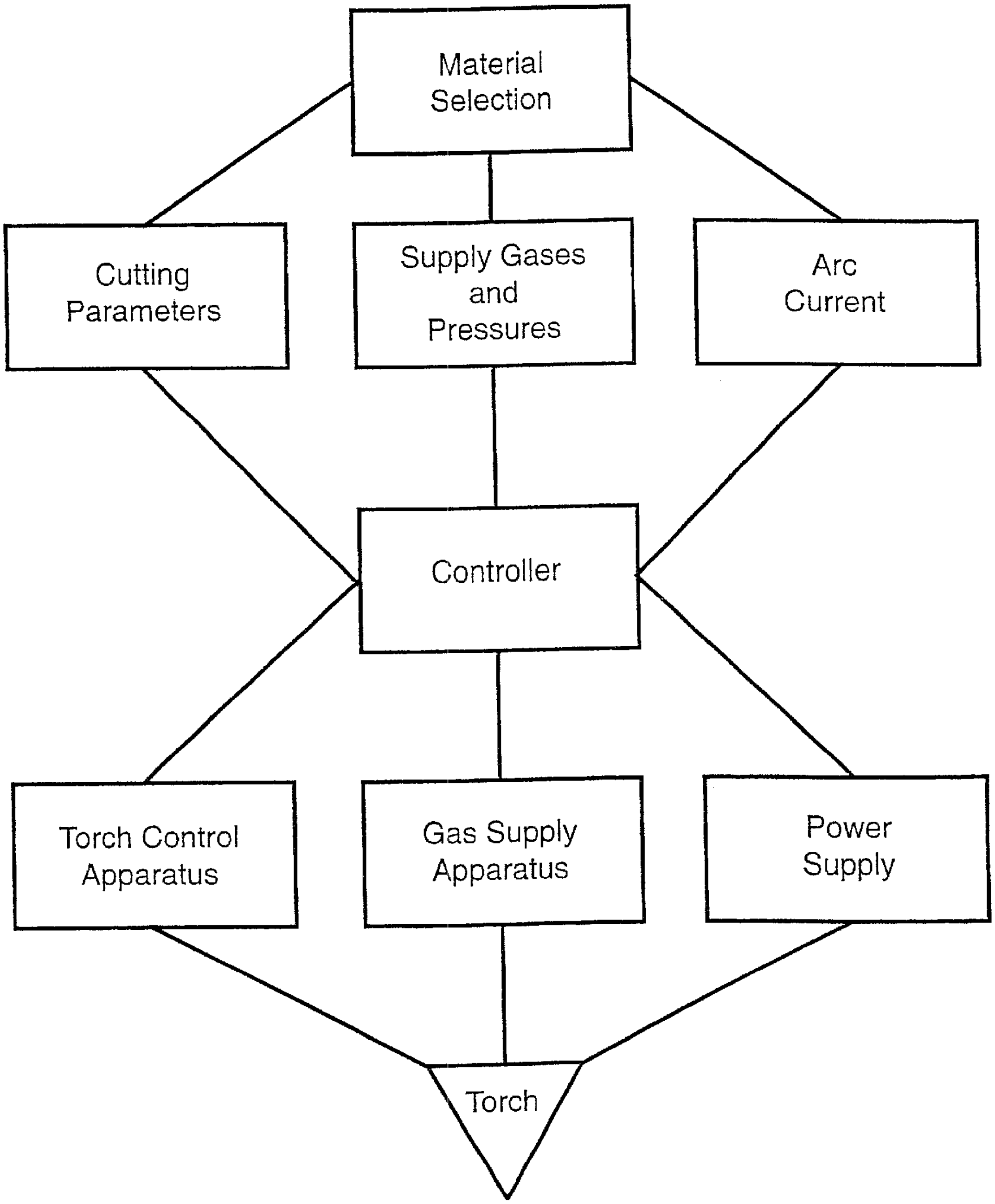
FIG. 2 is a diagramatic representation of a control process according to the invention.

The apparatus seen in reference to FIG. 1 may be used in an improved automated and controlled process of supplying gases to a plasma arc torch. One preferred sequence of control steps is discussed below and illustrated diagramatically in FIG. 2. It should be appreciated that the invention is not limited to only this sequence. Any number of variations can be made in the operating sequence that fall within the scope and spirit of the invention.

In an initial step, a user selects from a menu screen 20 of console 12 a "material selection" mode which offers default selections of, for example, "mild steel", "stainless steel", or "aluminum". A custom option of "other" is also available and will be described below. Upon selection of a default material, the menu screen prompts the user to enter the value for the material thickness. Certain standard thickness values are preferably listed, though non-standard values may be entered.

Following the selection of the material and thickness, the microprocessor sets a type of gas and gas pressure for each of the supply gasses. Default settings are selected or interpolated by the microprocessor from stored information. The operator also has the option to override the default settings and manually input another gas or pressure.

Upon selection of a material and thickness, suggested cutting parameters are calculated and displayed on the user screen 20. The displayed cutting parameters may include, "torch travel speed", "cutting height", "arc voltage," and "piercing height". For each of the above parameters, the user may select displayed default values or input values within established operational parameters. The selected cutting parameters may be transmitted to the X-Y actuator 200 or torch control apparatus, such as the INOVA torch control apparatus by Innerlogic, Inc. of Charleston, SC, used to control the travel motions of the torch. An additional menu option provides for a listing of suitable torch models and component parts so that the operator may verify that a proper plasma arc torch assembly is in place.

The microprocessor also automatically calculates and sends an arc current value to the power source.

When a thickness value for a given current set point is entered that is not listed as a standard value, default parameters are calculated from known values. The calculations for arc voltage and travel speed are based upon plot interpolations. All other default parameters are set to match the nearest known value. Parameter values for arc voltage and travel speed are interpolated by a line point intersection method. If the unlisted thickness point lies between two known thickness values, a line between the known values is established that will intersect the unlisted thickness point. The slope of the line is based upon thickness versus either arc voltage or travel speed. Default values for travel speed and arc voltage are obtained from the point where the line intersects the unlisted thickness point. When an unlisted thickness point lies outside the range of listed thickness values, a line is established with its slope derived from the two nearest listed thickness values. Again, default values for travel speed and arc voltage are obtained from the point where the line intersects the unlisted thickness point.

Once all input values have been selected and accepted, the values are transmitted to an integrated power controller which provides power to the torch and initiates start-up and shut-down sequences for the plasma arc torch. The power controller and the gas control process described herein, provides for serial communication and coordination of actions and data between the torch, the power supply, and the gas supply apparatus.

One such power supply is commercially available from Innerlogic, Inc., Charleston, S.C., Model No. FL-100 Power Supply. A suitable torch is also commercially available from Innerlogic, Inc., such as Model No. FL-100 Torch.

The pressure of the various supplied gases is monitored. The control system can adjust the motor drives of the pressure regulators and thereby make real time adjustments to the supply gas pressures during torch operation.

It is conventional within the operation of a plasma arc torch to provide a water cooling system which may make use of a recirculating supply of deionized water. A thermocouple or other temperature sensing device may be used to measure the temperature of the coolant water. The gas supply control apparatus and process set forth in this invention may also include a monitoring and alarm feature which prevents operation of the torch when there is an inadequate supply or temperature of cooling water available.

The integrated nature of the power control systems with the gas control system enables a more efficient operation of the torch. The costs of torch consumables may be reduced. Further, more rapid operator adjustments and cutting protocols can be selected, reducing set up times in comparison to a manually adjusted gas control supply.

In addition, the present invention is particularly useful for implementing controlled torch shut down sequences. The shut down sequences require precise regulation of gas flow pressures and flow durations. For example, shut down protocols such as those described in applicant's co-pending applications vary depending upon the number of piercing start-up cycles the torch has undergone. The integrated power and gas control systems tracks the number of cycles and will automatically implement an appropriate shut-down sequence for the individual torch, making use of the gas supply control process described herein.

The gas control system and software also permits the user to establish and store for future use custom settings of non-standard materials. To create a custom setting, the user would modify an existing default setting or select "other" when prompted and thereafter enter the desired cutting parameters, gas selections and gas pressures.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. A supply gas controller for a plasma arc torch comprising:

a console defining a housing and having a user interface;

a plurality of gas inlet ports mounted within the housing, each inlet port adapted for receiving an external source of a pressurized gas;

a plurality of solenoid valves disposed within said housing, each of said solenoid valves in communication with at least one of said inlet ports for selection of various combinations of the pressurized gasses;

a pre-flow pressure regulator in fluid communication with one of said inlet ports and a pressurized pre-flow gas source;

a post flow pressure regulator in fluid communication with one of said inlet ports and a pressurized post flow gas source;

a plasma gas pressure regulator in fluid communication with at least two of said solenoid valves for selection of a plasma gas from at least two of the pressurized gasses;

a shield gas pressure regulator in fluid communication with at least two of said solenoid valves for selection of a shield gas from at least two of the pressurized gasses;

a microprocessor responsive to a signal from said user interface, the microprocessor further providing a control means for said plurality of solenoid gas valves and said pressure regulators, said microprocessor further responsive to an operating condition of said plasma arc torch;

selecting a shutdown sequence of said plasma gas and said post flow gas in response to said operating condition of said torch; and, wherein, in response to a signal from said user interface, said microprocessor selects a pre-flow gas and gas pressure, a plasma gas and gas pressure, a shield gas and gas pressure, and a post flow gas and gas pressure, and initiates and controls the gas flows and pressures at the appropriate time in the torch cutting cycle.

2. The apparatus according to claim 1 wherein each pressure regulator is monitored by a pressure sensor, the pressure sensor in further communication with the microprocessor.

3. The apparatus according to claim 1, comprising at least one said solenoid valve for each of the pressurized gasses.

4. The apparatus according to claim 3, wherein said shield gas pressure regulator is in communication with said solenoid valves for pressurized gasses consisting of air, nitrogen, oxygen, and another gas.

5. The apparatus according to claim 3, wherein said plasma gas pressure regulator is in communication with said solenoid valves for pressurized gasses consisting of air, nitrogen, and oxygen.

6. The apparatus according to claim 1, wherein said microprocessor also automatically sets arc current for the torch.

7. The apparatus according to claim 1, wherein said microprocessor also automatically computes operational parameters consisting of any combination of cutting height, piercing height, and arc voltage.

8. The apparatus according to claim 7, wherein said microprocessor sends said operational parameters to a torch control apparatus.

9. The supply gas controller according to claim 1 wherein torch operating condition to which said microprocessor is responsive further includes a cumulative number of torch pierces.

10. A process of supplying pre-flow, plasma, shield, and post flow gases to a plasma arc torch comprising:

selecting a type and thickness of workpiece material;

based on the type and thickness of material, automatically selecting sources for the supply gasses and setting pressure settings for the gasses, the supply gasses including pre-flow, plasma, shield, and post flow gasses;

automatically calculating and displaying certain cutting parameter values as determined from the inputted type and thickness of the material workpiece;

supplying the selected pre-flow gas at the selected pressure to the plasma arc torch in response to a start-up sequence;

supplying the selected plasma gas at the selected pressure to the plasma arc torch in response to the start-up sequence;

supplying the shield gas at the selected pressure to the plasma arc torch in response to the start-up sequence;

maintaining the selected plasma gas and shield gas at the respective pressures;

monitoring a cumulative number of torch pierces; and, supplying upon initiation of a torch shut down sequence, the post flow gas at the selected pressure and for a time interval selected in response to said cumulative number of torch pierces.

11. The process as in claim 10, further comprising forwarding the cutting parameters to a torch control apparatus.

12. The process as in claim 10, further comprising automatically setting and forwarding an arc current value to a power supply.

13. The process according to claim 10 of automatically calculating and displaying certain cutting parameters further includes calculating a plot interpolation to match nearest known values.

* * * * *